United States Patent [19]

Bohler

[11] 4,439,562
[45] Mar. 27, 1984

[54] POLYMERIC MATERIAL MASS-DYED WITH CERTAIN METALIZED BIS-AZOMETHINE DYESTUFFS

[75] Inventor: Hans Bohler, Rheinfelden, Switzerland

[73] Assignee: Sandoz Ltd., Basel, Switzerland

[21] Appl. No.: 408,190

[22] Filed: Aug. 16, 1982

[30] Foreign Application Priority Data

Aug. 26, 1981 [DE] Fed. Rep. of Germany ....... 3133680

[51] Int. Cl.³ .......................... C08K 5/23; C08K 5/56; C08J 3/20; C09B 55/00
[52] U.S. Cl. ....................................... 524/90; 524/89; 524/176; 524/204
[58] Field of Search ................... 524/89, 176, 90, 204; 106/288 Q

[56] References Cited

U.S. PATENT DOCUMENTS

| | | | |
|---|---|---|---|
| 3,895,041 | 7/1975 | Inman | 106/288 Q |
| 4,008,225 | 2/1977 | L'Aplattenier et al. | 260/240 |
| 4,097,510 | 6/1978 | Papenfuhs et al. | 106/288 Q |
| 4,294,749 | 10/1981 | Papenfuhs et al. | 524/237 |

FOREIGN PATENT DOCUMENTS

1416293 9/1965 France .
36-16432 9/1961 Japan .

OTHER PUBLICATIONS

Chem. Abs. 78138 (75), 1971.
Chem. Abs. 154691 (81), 1974.
Chem. Abs. 122782z (81), 1974.
Chem. Abstracts, 27, 4225 (1933), P. Pfeiffer et al.

Primary Examiner—John C. Bleutge
Assistant Examiner—Herbert J. Lilling
Attorney, Agent, or Firm—Gerald D. Sharkin; Richard E. Vila; Thomas C. Doyle

[57] ABSTRACT

Disclosed is a mass-dyed polymeric material, e.g. polyester, comprising, as dyestuff, a compound or mixture of compounds of formula I

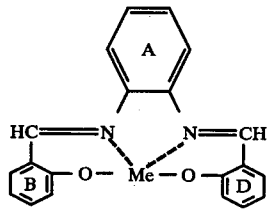

herein the nuclei A, B and D may bear one or more substituents and Me is Ni or Cu. The mass-dyed polymeric material is preferably prepared by incorporating the compounds of formula I in form of a master-batch.

27 Claims, No Drawings

POLYMERIC MATERIAL MASS-DYED WITH CERTAIN METALIZED BIS-AZOMETHINE DYESTUFFS

The invention relates to mass-dyed polymeric material, particularly spun mass-dyed linear, aromatic polyester and synthetic polyamides.

The invention provides mass-dyed polymeric material comprising as dyestuff, a compound or a mixture of compounds of formula I

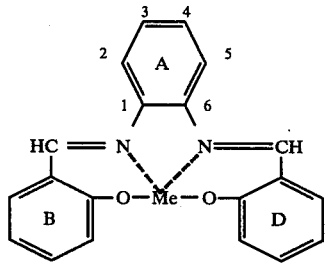

wherein
the nucleus A is unsubstituted or substituted by up to two substituents selected from cyano; halogen; nitro; methyl; ethyl; $C_{1-4}$alkoxy; benzoylamino; benzoylamino the phenyl ring of which is substituted by up to two substituents selected from chlorine, bromine, methyl, benzoyl, methoxy, ethoxy and nitro; $C_{2-3}$-acylamino; carboxy; alkoxy $C_{1-4}$-carbonyl; carbamoyl; alkyl $C_{1-4}$-carbamoyl; di($C_{1-4}$alkyl)-carbamoyl; phenylcarbamoyl; phenylsulphamoyl; and N-$C_{1-4}$alkyl-N-phenylcarbamoyl,
the nuclei B and D, independently, are each unsubstituted or substituted by up to three substituents selected from those defined above for nucleus A, and
Me is nickel or copper,
with the proviso that when the nuclei B and D are each substituted by halogen then the nucleus A is substituted in the 3- or 4-position by a substituent distinct from halogen or nitro.

Preferably the mass-dyed polymeric material of the invention is a spun mass-dyed material.

As it will be appreciated the compounds of formula I are distinct from known pigments in that they are substantially soluble in the polymeric spun mass, i.e. the compounds of formula I are present in dissolved form in the polymeric material.

Furthermore, the present invention also provides a process for producing a mass-dyed polymeric material comprising dissolving in the polymeric material a compound or a mixture of compounds of formula I, as stated above, and uniformly distributing it throughout the polymeric material.

In the compounds of formula I, where the nucleus A is substituted, it is preferably substituted by up to two substituents selected from methyl, nitro, chlorine and carboxy, more preferably methyl or carboxy.

When either of the nuclei B and D is substituted, It is preferably substituted by up to two substituents selected from methyl, methoxy, ethoxy and phenylsulphamoyl. More preferably the nuclei B and D are unsubstituted.

Me is preferably nickel. Halogen is preferably chlorine or bromine, more preferably chlorine.

Preferably the mass-dyed polymeric material of the invention comprises as dyestuff a compound or mixture of compounds of formula Ia

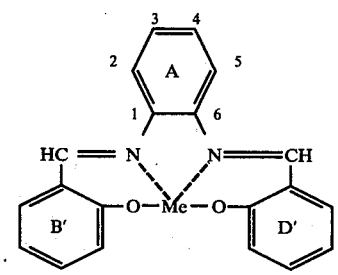

wherein the nuclei B' and D' are each unsubstituted or substituted as defined above for the nuclei B and D, except that the nuclei B' and D' are not substituted by halogen, and nucleus A is unsubstituted or substituted as defined above.

The preferred mass-dyed polymeric material comprises as dyestuff a compound or mixture of compounds of formula Ib

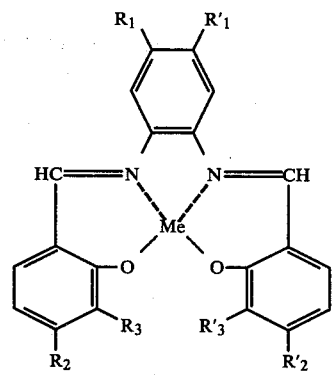

wherein
$R_1$ and $R_1'$, independently, are hydrogen, methyl, nitro, chlorine or carboxy,
$R_2$ and $R_2'$, independently, are hydrogen or phenylsulphamoyl,
$R_3$ and $R_3'$, independently, are hydrogen, methyl, methoxy or ethoxy and
Me is nickel or copper.

Preferred compounds of formula Ib are those wherein Me is nickel.

The most preferred mass-dyed polymeric material provided by the invention comprises, as dyestuff, a compound or mixture of compounds of formula Ib wherein $R_1$ is hydrogen, chlorine, methyl, nitro or carboxy, preferably hydrogen or carboxy, and $R_1'$, $R_2$, $R_2'$, $R_3$ and $R_3'$ are all hydrogen; or wherein both $R_1$ and $R_1'$ are methyl and $R_2$, $R_2'$, $R_3$ and $R_3'$ are all hydrogen.

The compounds of formula I are known compounds or may be produced from available starting materials in analogous manner to known methods (see for example Pfeiffer, Liebig's Annalen, 503, 84–130 [1933]).

Suitable polymeric materials include linear, aromatic polyester, synthetic polyamides, polyolefines, e.g. polyethylene or polypropylene, polyvinyl chloride and polyacrylonitrile. Preferably the polymeric material is linear, high molecular weight, aromatic polyester or a synthetic polyamide, e.g. nylon 6 or 66. The polyester itself is preferably that produced by polycondensation of terephthalic acid and optionally isophthalic acid with ethylene glycol and/or cyclohexanediol.

The mass-dyeing is suitably carried out in conventional manner, using the compounds of formula I alone or mixed with each other or with one or more other dyes indicated for the mass-dyeing of polymeric materials. The dyes may be purified and ground in conventional manner prior to their incorporation.

The preferred method of producing the mass-dyed polymeric material according to the invention is first to mix the dyestuff generally in an amount of 15 to 60% by weight, with a part of polymeric material to be mass-dyed, preferably 85 to 40% by weight, to form a concentrate referred to as "master-batch" and then adding this master-batch in the desired amount, depending on the depth of colour required in the final polymeric material, to the polymeric material and distributing the dyestuff throughout the polymeric material. Such master-batches or concentrated compositions also form part of the invention.

The mixing of the dyestuff with the polymeric material to prepare the master-batch is suitably effected e.g. by grinding both the dyestuff and the polymeric material together to form a fine powder and, optionally, processing the powder through an extruder and forming chips or a granulate from the extrudate. When the polymeric material is a polyester as disclosed above, the dyestuff is preferably first mixed with a relatively low-melting, linear, aromatic polyester, e.g. having a melting range in the range from 75° to 230° C., to form the master-batch. This mixing is preferably carried out at low temperature, e.g. employing dry ice as coolant.

The master batch may be added either in powder, chip or granulate form to the undyed polymeric material, e.g. in the granulate form, or in molten form to the molten polymeric material.

After addition of the master-batch to the polymeric material, the resulting mix can be formed into shaped articles, such as films or foils or, preferably, fibres or filaments, in conventional manner, e.g. by extrusion or spinning techniques, and such articles further processed, e.g. into yarn, cord, rope, woven, non-woven and knitted goods, or the mix can be formed into granules or chips for subsequent melting and formation into such shaped articles.

According to another embodiment of the process of the invention, when the polymeric material is polyester, the compounds of formula I can also be incorporated into the unpolymerised or partially polymerised polyester precursors, and the polycondensation carried out or completed in the presence of the dye.

The process of the invention is preferably used for producing spun mass-dyed linear aromatic polyester fibres.

The mass-dyed polymeric material according to the invention has good allround fastness properties, e.g. to light, migration, vehicle exhaust fumes, ozone and sublimation, as well as good wet fastness. Of particular interest, however, is the fact that the compounds of formula I show very good resistance to the extreme conditions, e.g. high temperature, employed in extrusion and especially spinning operations performed to produce shaped articles.

The following Examples in which all parts and percentages are by weight and all temperatures in degrees centigrade illustrate the invention.

EXAMPLE 1

1,000 Parts of a commercial polyester formed by condensation of terephthalic acid and ethylene glycol are ground in a pin mill to a powder whose particles have a diameter of between 300 and 600$\mu$. This polyester powder is mixed well at room temperature in a closed mixer with 150 parts of a dyestuff of formula Ib wherein $R_1$, $R_1'$, $R_2$, $R_2'$, $R_3$ and $R_3'$ are hydrogen and Me is nickel. This mixture is subsequently processed in an extruder at 250° to form a cable which is then cut to a granulate.

The dyestuff concentrate, produced as described above, is melted in the secondary feed line of a helical spinning machine and is added at 270°–275° by a metering device to commercial, linear, aromatic polyester (polyethylene terephthalate) heated with the primary feed of the spinning machine. The metering device adds to the polyester feed 4 parts of dyestuff concentrate per 48 parts of polyethylene terephthalate. The mixture is then spun at 270°–275° at a wind-up speed of 200 meters per minute, the spun fibres are stretched at 90° in a drawing machine in the ratio of 1:4 and are twisted in the usual manner in a ring twister. A brown-orange mass-dyed yarn is thus obtained with good fastness properties.

The unsubstituted dyestuff of formula Ib used above and wherein Me is nickel may be produced as follows:

To 22.4 parts salicyclic aldehyde dissolved in 200 ml ethanol at the boil is added a solution of 24.9 parts Ni(CH$_3$CO$_2$)$_2$.4H$_2$O and 27.2 parts sodium acetate in 100 parts water. After one hour refluxing, there is slowly added at the boil a solution of 10.8 parts o-phenylenediamine in 80 parts ethanol. The mixture is further refluxed for 5 hours and, after cooling to room temperature, the red-brown precipitate which is obtained is filtered, washed with a small amount of ethanol and dried.

The resulting dyestuff is then treated for purification at the boil for 1 hour in 200 parts dimethylformamide, the suspension is filtered cold, the filtration residue is washed with dimethylformamide, ethanol and water and then dried under vacuum.

Following the above procedure but replacing the dyestuff used therein with a dyestuff of formula Ia as specified in the Table below there are obtained mass-dyed yarns having a shade from greenish yellow to dark red-brown with good fastness properties.

TABLE

| Ex. | $R_1$ | $R'_1$ | $R_2$ | $R'_2$ | $R_3$ | $R'_3$ | Me | Shade |
|---|---|---|---|---|---|---|---|---|
| 2 | NO$_2$ | H | H | H | H | H | Ni | red-brown (dark) |
| 3 | COOH | H | H | H | H | H | Ni | red-brown |
| 4 | CH$_3$ | CH$_3$ | H | H | H | H | Ni | brown-orange |
| 5 | CH$_3$ | H | H | H | H | H | Ni | brown-orange |
| 6 | Cl | H | H | H | H | H | Ni | brown-orange |
| 7 | H | H | phenyl-sulphamoyl | phenyl-sulphamoyl | H | H | Ni | gold-yellow |
| 8 | H | H | H | H | OCH$_3$ | OCH$_3$ | Ni | yellow-brown |
| 9 | Cl | H | H | H | H | H | Cu | greenish-yellow |

TABLE-continued

| Ex. | $R_1$ | $R'_1$ | $R_2$ | $R'_2$ | $R_3$ | $R'_3$ | Me | Shade |
|---|---|---|---|---|---|---|---|---|
| 10 | $CH_3$ | H | H | H | H | H | Cu | greenish-yellow |

EXAMPLE 11

1,360 Parts ethylene glycol and 1,700 parts dimethyl terephthalate were stirred with 0.55 parts manganese acetate for 3½ hours at 180° and the methanol produced was distilled off.

The mass is then transferred to a vacuum container suitable for polycondensation and a mixture of 80 parts ethylene glycol, 0.45 parts antimony trioxide, 2.0 parts trinonylphenyl phosphite and 17 parts of the dyestuff used in Example 1 is added to the mass. The vacuum is successively increased to 1 Torr at 275° until the intrinsic viscosity of $\eta=0.70$ is reached by distillation of ethylene glycol.

The dyed polyester obtained is then extruded into water to cool and is granulated. The granules are vacuum dried at 140° for 16 hours and finally spun, stretched and twisted as described in Example 1. A brown-orange yarn with good properties is obtained.

Following the above procedure but replacing therein the dyestuff of Example 1 by anyone of Examples 2 to 10, yarns having similar good properties are obtained.

What is claimed is:

1. Mass-dyed polymeric material having dissolved therein, as dyestuff, a compound or a mixture of compounds of formula I

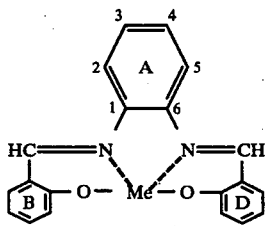

wherein
the nucleus A is unsubstituted or substituted by up to two substituents selected from cyano; halogen; nitro; methyl; ethyl; $C_{1-4}$alkoxy; benzoylamino; benzoylamino the phenyl ring of which is substituted by up to two substituents selected from chlorine, bromine, methyl, benzoyl, methoxy, ethoxy and nitro; $C_{2-3}$-acylamino; carboxy; alkoxy $C_{1-4}$-carbonyl; carbamoyl; alkyl $C_{1-4}$-carbamoyl; di($C_{1-4}$alkyl)carbamoyl; phenylcarbamoyl; phenylsulphamoyl; and N-$C_{1-4}$alkyl-N-phenylcarbamoyl,
the nuclei B and D, independently, are each unsubstituted or substituted by up to three substituents selected from those defined above for nucleus A, and
Me is nickel or copper,
with the proviso that when the nuclei B and D are each substituted by halogen then the nucleus A is substituted in the 3- or 4-position by a substituent other than halogen or nitro.

2. Mass-dyed polymeric material according to claim 1, having dissolved therein, as dyestuff, a compound or mixture of compounds of formula I wherein the nucleus A is unsubstituted or substituted by up to two substituents selected from methyl, nitro, chlorine and carboxy.

3. Mass-dyed polymeric material according to claim 1 having dissolved therein, as dyestuff, a compound or mixture of compounds of formula I wherein the nuclei B and D, independently, are each unsubstituted or substituted by up to two substituents selected from methyl, methoxy, ethoxy and phenylsulphamoyl.

4. Mass-dyed polymeric material according to claim 1 having dissolved therein, as dyestuff, a compound or mixture of compounds of formula Ib

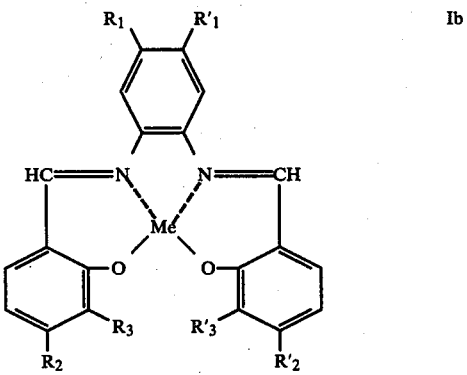

wherein
$R_1$ and $R_1'$, independently, are hydrogen, methyl, nitro, chlorine or carboxy,
$R_2$ and $R_2'$, independently, are hydrogen or phenylsulphamoyl,
$R_3$ and $R_3'$, independently, are hydrogen, methyl, methoxy or ethoxy and
Me is nickel or copper.

5. Mass-dyed polymeric material according to claim 4, having dissolved therein, as dyestuff, a compound or mixture of formula Ib wherein $R_1$ is hydrogen, chlorine, methyl, nitro or carboxy and each $R_1'$, $R_2$, $R_2'$, $R_3$ and $R_3'$ is hydrogen.

6. Mass-dyed polymeric material according to claim 4, having dissolved therein, as dyestuff, a compound or mixture of formula Ib, wherein each $R_1$, $R_1'$, $R_2$, $R_2'$, $R_3$ and $R_3'$ is hydrogen.

7. Mass-dyed polymeric material according to claim 4, having dissolved therein, as dyestuff, a compound or mixture of formula Ib wherein $R_1$ is carboxy and each $R_1'$, $R_2$, $R_2'$, $R_3$ and $R_3'$ is hydrogen.

8. Mass-dyed polymeric material according to claim 4, having dissolved therein, as dyestuff, a compound or mixture of formula Ib wherein each $R_1$ and $R_1'$ is methyl and each $R_2$, $R_2'$, $R_3$ and $R_3'$ is hydrogen.

9. Mass-dyed polymeric material according to claim 1 having dissolved therein, as dyestuff a compound or mixture of compounds wherein Me is nickel.

10. Mass-dyed polymeric material according to claim 1 wherein the polymeric material is linear, aromatic polyester, a synthetic polyamide, a polyolefine, polyvinyl chloride or polyacrylonitrile.

11. Mass-dyed polymeric material according to claim 1 in the form of spun filaments.

12. A process for producing mass-dyed polymeric material according to claim 1 comprising dissolving in the polymeric material a compound or mixture of compounds of formula I and uniformly distributing it throughout the polymeric material.

13. A composition according to claim 1 wherein, in formula I, any substituents on the nuclei B and D are other than halogen.

14. A composition according to claim 3 wherein the nucleus A is unsubstituted or substituted by up to two substituents selected from methyl, nitro, chlorine and carboxy.

15. A composition according to claim 14 wherein the nucleus A is unsubstituted or substituted by up to two substituents selected from methyl and carboxy and the nuclei B and D are unsubstituted.

16. A composition according to claim 4 wherein the polymeric material is linear aromatic polyester, a synthetic polyamide, a polyolefin, polyvinyl chloride or polyacrylonitrile.

17. A composition according to claim 5 wherein the polymeric material is a synthetic polyamide or linear, high molecular weight aromatic polyester.

18. A process for producing mass-dyed polymeric material according to claim 16 which comprises dissolving in the polymeric material a compound or mixture of compounds of formula Ib and uniformly distributing it throughout the polymeric material.

19. A composition comprising from 15 to 60% by weight of a compound of formula I

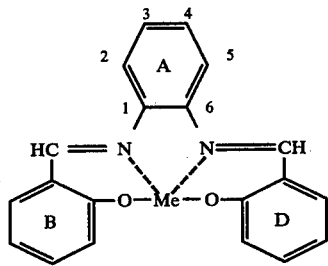

wherein the nucleus A is unsubstituted or substituted by up to two substituents selected from cyano; halogen; nitro; methyl; ethyl; $C_{1-4}$alkoxy, benzoylamino; benzoylamino the phenyl ring of which is substituted by up to two substituents selected from chlorine, bromine, methyl, benzoyl, methoxy, ethoxy and nitro; $C_{2-3}$acylamino; carboxy; alkoxy $C_{1-4}$-carbonyl; carbamoyl; alkyl $C_{1-4}$-carbamoyl; di($C_{1-4}$alkyl)carbamoyl; phenylcarbamoyl; phenylsulphamoyl; and N-$C_{1-4}$alkyl-N-phenylcarbamoyl the nuclei B and D, independently, are each unsubstituted or substituted by up to three substituents selected from those defined above for nucleus A, and Me is nickel or copper, with the proviso that when the nuclei B and D are each substituted by halogen then the nucleus A is substituted in the 3- or 4-position by a substituent other than halogen or nitro, in dissolved form, and 85 to 40% by weight of polymeric material.

20. A composition according to claim 19 wherein the polymeric material is linear aromatic polyester, a synthetic polyamide, a polyolefin, polyvinyl chloride or polyacrylonitrile.

21. Spun mass-dyed linear aromatic polyester according to claim 1.

22. Spun mass-dyed linear aromatic polyester according to claim 4.

23. A process according to claim 18 wherein the polymeric meterial is linear aromatic polyester and which includes the further step of spinning the mass-dyed polyester into fibers.

24. Spun mass-dyed linear aromatic polyester according to claim 5.

25. Spun mass-dyed linear aromatic polyester according to claim 6.

26. Spun mass-dyed linear aromatic polyester according to claim 7.

27. Spun mass-dyed linear aromatic polyester according to claim 8.